W. H. DOUGLAS.
AUXILIARY SEAT FOR AUTOMOBILES.
APPLICATION FILED FEB. 24, 1916.
1,211,108.
Patented Jan. 2, 1917.
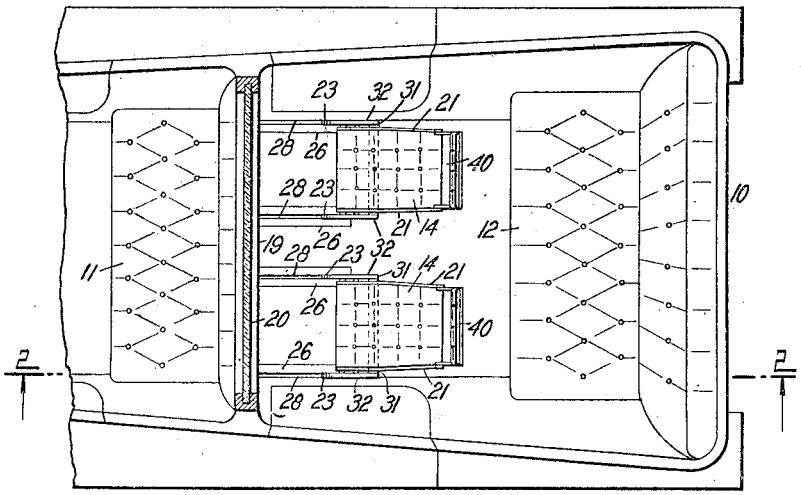
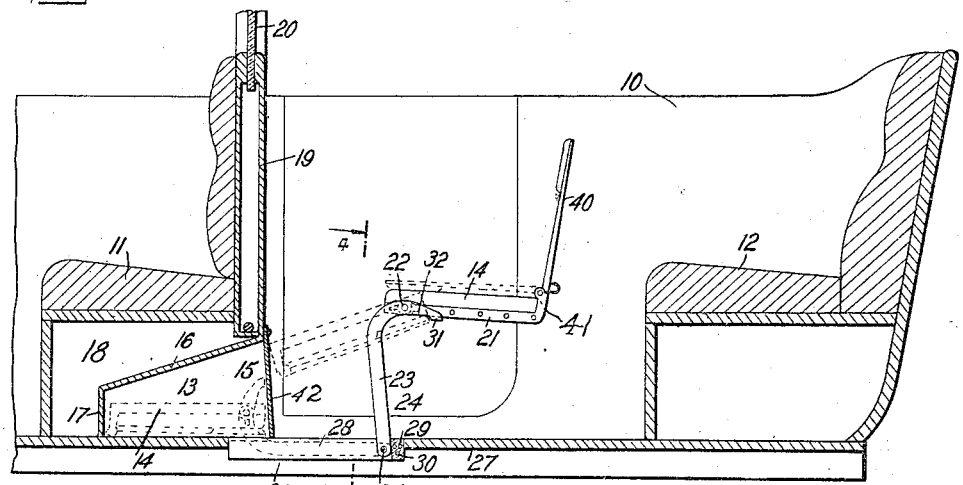
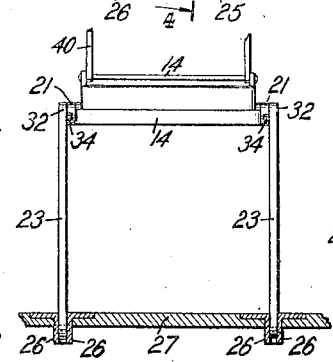
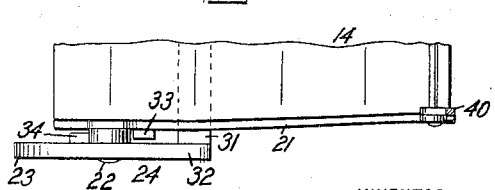
WITNESSES
INVENTOR
William H. Douglas
BY
ATTORNEYS

UNITED STATES PATENT OFFICE.

WILLIAM H. DOUGLAS, OF BELLEVILLE, NEW JERSEY, ASSIGNOR TO HEALEY & CO., OF NEW YORK, N. Y.

AUXILIARY SEAT FOR AUTOMOBILES.

1,211,108.  Specification of Letters Patent.  Patented Jan. 2, 1917.

Application filed February 24, 1916. Serial No. 80,176.

*To all whom it may concern:*

Be it known that I, WILLIAM H. DOUGLAS, a citizen of the United States, and a resident of Belleville, in the county of Essex and State of New Jersey, have invented a new and Improved Auxiliary Seat for Automobiles, of which the following is a full, clear, and exact description.

The invention relates to automobiles having, at least, one front and one rear seat, and its object is to provide a new and improved auxiliary seat arranged to permit convenient folding, when not in use, under the front seat, and to allow quick and safe extending for use without interfering with the comfort of the persons on the rear seat of the automobile and without interfering with the lowering of the wind shield on the back of the front seat.

In order to accomplish the desired result, use is made of a seat fulcrumed at its forward end on a swing frame pivoted on the bottom of the automobile body to swing from extended and approximately vertical position in a forward and downward direction into folded position on the bottom of the automobile body, the swing frame having a supporting member adapted to be engaged by the bottom of the seat to hold the latter in extended position, the said swing frame and the said seat having co-acting members adapted to engage one another on swinging the seat over into inactive position to support the seat from the swing frame at the time the latter is in folded position and within a recess or storage chamber formed under the front seat.

A practical embodiment of the invention is represented in the accompanying drawings forming a part of this specification, in which similar characters of reference indicate corresponding parts in all the views.

Figure 1 is a plan view of a portion of an automobile body provided with two auxiliary seats in extended postion; Fig. 2 is an enlarged sectional side elevation of the same on the line 2—2 of Fig. 1; Fig. 3 is a plan view of a portion of one of the auxiliary seats; and Fig. 4 is a cross section of the same on the line 4—4 of Fig. 2.

The automobile body 10 is provided with the usual front seat 11 and the rear seat 12, and under the front seat 11 is formed a storage chamber 13 for receiving the auxiliary seat 14 at the time the latter is in folded position and not in use. The storage chamber 13 is open at the rear end 15 and has its top 16 inclined downwardly and forwardly with the front end 17 a distance from the front end of the seat 11 to provide sufficient room 18 under the seat 11 for the storage of tools and the like. The upper rear end of the top 16 is sufficiently low down at the back 19 of the front seat 11 to allow of lowering the wind shield 20 in the said back 19 in the usual manner whenever it is desired to do so. The auxiliary seat 14 is provided with side arms 21 fulcrumed at 22 on the side arms 23 of a swing frame 24. The side arms 23 of the swing frame 24 are fulcrumed on pivots 25 held on angle irons 26 let into the floor 27 of the automobile body 10, the said angle irons forming recesses 28 into which fold the side arms 23 on swinging the latter forwardly and downwardly, as indicated in dotted lines in Fig. 2. The upper swinging movement of the side arms 23 of the swing frame 24 is limited by blocks 29 extending between the angle irons 26 and fastened thereto by suitable bolts or rivets 30, as indicated in the drawings.

The side arms 21 of the auxiliary seat 14 are adapted to rest on a crossbar 31 formed integrally, connecting the free ends of the side arms 23 with each other, the said crossbar 31 being located a distance from the pivot 22 on which the side arms 21 of the auxiliary seat are mounted to swing. By reference to Fig. 2, it will be noticed that the side arms 23 have upwardly curved members 32 carrying the pivots 22 and the crossbar 31.

The side bars 21 of the auxiliary seat 14 are provided with lugs 33 adapted to engage similar lugs 34 formed on the side arms 23 to the left of the pivots 22 so that when the auxiliary seat 14 is swung over from the extended position shown in Fig. 2 into a folded position, as shown in dotted lines in Fig. 2, then the lugs 33 engage the lugs 34 to support the auxiliary seat 14 in this folded position. By reference to Fig. 2, it will be noticed that the angle irons 26 and the slots 29 formed thereby extend into the rear end of the storage chamber 13 and the side arms 23 of the swing frame 24 are of a corresponding length, so that when the swing frame is swung downward and forward into folded position with the auxiliary seat in folded position as above described, then the said auxiliary seat is projected into the storage chamber 13 together with the angular ends 32 and the crossbar 31. Thus the entire auxiliary seat with its supporting swing frame is completely out of the way and takes up no room whatever between the front seat 11 and the rear seat 12. When it is desired to extend and make use of the auxiliary seat 14 it is only necessary to take hold of the crossbar 31 and exert a pull thereon in an upward and rearward direction to cause the swing frame 24 to swing upward into an approximately vertical position, and when this has been done the seat 14 is swung upwardly and rearwardly until the side arms 21 of the seat 14 rest on the crossbar 31. It will be noticed that by the arrangement described sufficient room is had between the extended auxiliary seat 14 and the rear seat 12 so as not to interfere with the comfort of the persons seated on the seat 12, and the auxiliary seat 14 is a sufficient distance from the front seat 11 to give the desired comfort to the occupant of the auxiliary seat 14.

In practice, preferably two auxiliary seats are provided, as shown in Fig. 1, the sides being located near the sides of the automobile body, or, if desired, only one seat may be used, located at the middle of the automobile body.

The auxiliary seat 14 is preferably provided with a lazy back 40 fulcrumed at the angular ends 41 of the side arms 21 of the auxiliary seat 14 to allow of swinging the said lazy back 40 into extended position, as indicated in detail in Fig. 2, or down into folded position on top of the auxiliary seat 14.

The open end 15 of the storage chamber is normally closed by an apron 42 hanging down from the back of the front seat 11. The straight portions of the side arms 23 of the swing frame 24 when in folded position between the angle irons are covered up by the carpet, mat, rug or other floor covering on the bottom of the car body and which covering also extends over the upper edges of the angle irons.

Having thus described my invention, I claim as new and desire to secure by Letters Patent:

In combination, a vehicle body having an auxiliary seat storage chamber under a seat thereof for receiving said auxiliary seat when not in use, a swing frame pivoted on the bottom of the vehicle and rearwardly of said chamber and including oppositely disposed side arms, the main portions of which are straight and the free ends thereof curved, the extremities of such curved ends being connected by a transverse seat supporting bar, members mounted in the bottom of the vehicle for forming slots to receive said side arms when swung to a horizontal position, the curved ends of said arms then extending upwardly, and the transverse bar providing a handle for swinging the said frame to a substantially vertical position, a seat pivoted intermediate the extremities of said curved ends and adapted to engage and be supported by said transverse bars when in use, and stop lugs carried by said seat and curved ends of said side arms for limiting the swinging movement of said swinging frame when the seat is adjusted to folding position prior to being nested in said storage casing.

In testimony whereof I have signed my name to this specification in the presence of two subscribing witnesses.

WILLIAM H. DOUGLAS.

Witnesses:
THEO. G. HOSTER,
PHILIP D. ROLLHAUS.

Copies of this patent may be obtained for five cents each, by addressing the "Commissioner of Patents, Washington, D. C."